W. E. HOKE.
METHOD OF AND MEANS FOR DETECTING DEFECTS IN PARAMAGNETIC MATERIAL.
APPLICATION FILED JUNE 23, 1919.
1,426,384. Patented Aug. 22, 1922.
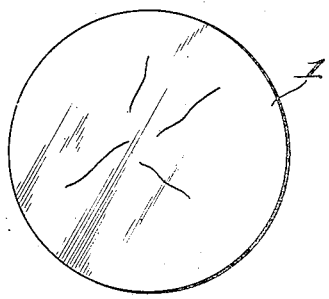
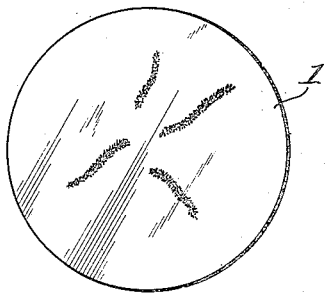
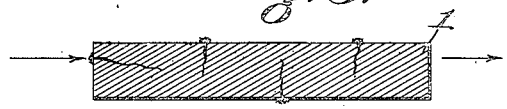
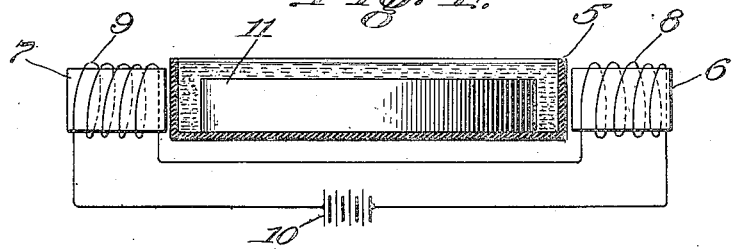
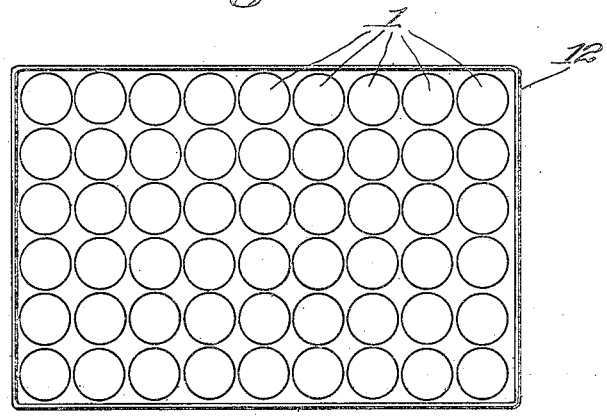

UNITED STATES PATENT OFFICE.

WILLIAM E. HOKE, OF WASHINGTON, DISTRICT OF COLUMBIA.

METHOD OF AND MEANS FOR DETECTING DEFECTS IN PARAMAGNETIC MATERIAL.

1,426,384.   Specification of Letters Patent.   Patented Aug. 22, 1922.

Application filed June 23, 1919. Serial No. 305,955.

*To all whom it may concern:*

Be it known that I, WILLIAM E. HOKE, a citizen of the United States, residing at Washington, District of Columbia, have invented certain new and useful Improvements in Methods of and Means for Detecting Defects in Paramagnetic Material, of which the following is a specification.

This invention relates to a method of and means for detecting flaws, cracks, discontinuities of any kind and strains in iron, steel and other paramagnetic materials.

In objects of iron, steel or other paramagnetic materials, the presence of cracks, flaws, discontinuities, strains, etc., will have an influence on the lines of magnetic flux set up by any cause in the material either through the agency of an external magnetizing force or some permanent magnetism in the objects, or from the natural field of the earth. When such cracks, flaws, discontinuities, strains, etc., are at or near the surface of the material they affect the magnetic lines of flux on the surface.

It is the general object of the invention to provide a method of and means for detecting the presence of defects of the character above referred to.

It is a particular object to detect defects which are too small to be readily observable by ordinary means or even with aid of the microscope.

It is the special object of the invention to detect defects by the utilization of the effects of a magnetic field at or near the surface of objects of paramagnetic material.

The invention briefly stated consists in subjecting a body to be examined to the action of a magnetic field in the presence of a finely subdivided magnetic medium.

For a fuller understanding of the principles upon which the application is based, reference is had to the accompanying drawings in which—

Fig. 1 is a plan view of a gage showing cracks;

Fig. 2 is a similar view showing finely divided particles of magnetic material attached to the gage under the influence of a magnetic field;

Fig. 3 is a sectional view of a gage showing the action of a magnetic field upon a crecked gage in the presence of a finely divided magnetic material;

Fig. 4 is a diagrammatic view of a gage placed in a magntic field in a bath containing finely divided paramagnetic material in suspension; and Fig. 5 is a plan view of a tray for simultaneously subjecting a plurality of gages to the action of a magnetic field in a bath containing suspended particles.

Fig. 1 represents a gage 1 containing for the purpose of illustration four cracks. These cracks are usually not visible to the eye and ordinarily not observable even under a microscope.

When however, the gage or other body of paramagnetic material is placed in a magnetic field and paramagnetic material in a state of fine subdivision is brought in proximity to the surface of the body under examination, part of the fine particles will cluster upon a crack or cracks that may exist and form a distinct observable mark, as indicated in Figs. 2 and 3. This phenomenon is probably due to magnetic induction, the portions of the body separated by the crack forming poles of opposite sign and the filings or other paramagnetic particles tending to close the gap like the armature of a magnet.

If the body to be examined is of fairly hard iron or steel, the magnetic field may be produced by merely magnetizing the body in any of the usual ways. If the body is of soft iron, it is necessary to produce a magnetic field and place the body into such field during examination.

While the object of the invention may be carried out in various ways so far as the bringing of the finely divided material into proximity to the surface of a body is concerned, I preferably suspend the fine filings in a fluid medium and surround the body by the fluid holding the particles in suspension. When under such conditions the body is placed in a magnetic field, the force of attraction exerted by the lines of force bridging the cracks is sufficient to draw the particles floating in proximity to the crack, to the surface of the body to close the magnetic gap while near other parts of the body the magnetic lines pass trough the body within the surface thereof and therefore do not disturb the statical condition of the floating particles or at least not to the same extent or with the same result. At any rate, whatever may be the correct theory in explanation of the phenomenon, the presence of cracks, flaws, discontinuities of any kind and strains, causes a non-uniform deposit of the particles held in suspension in the fluid upon the surface of the body under the influence of the magnetic field.

It is of course possible to hold particles in a state of suspension in various fluids and in various ways. So far as the broad conception of principles governing the invention goes, it is not essential what the particular fluid and incidents of suspension may be.

I have found that a liquid, such as oil, of a specific gravity to hold the particles in a state of equilibrium, or nearly so, gives full satisfaction. It is not necessary that the liquid be such as to normally keep the particles in suspension for an indefinite period. It is sufficient and even preferable for the purposes of the invention if the particles are normally kept in a state of suspension during a period which corresponds to the period of the test.

In Fig. 4 is diagrammatically shown a tray or pan 5 of diamagnetic material to receive the liquid containing the fine paramagnetic particles in suspension. On opposite sides of the tray are provided electromagnetic means including cores 6 and 7 and solenoids 8 and 9 respectively energized by current from a suitable source of supply, such as a battery 10. The body 11 to be examined is immersed in the liquid and subject to the action of the magnetic field.

In Fig. 5 is shown a tray or pan 12 of sufficient size to receive a relatively large number of gages or other bodies to be tested. It is understood that, as shown in Fig. 4, electromagnetic means are provided to cause a magnetic flux or magnetic lines of force to traverse the bodies contained in the pan 12.

It may be found advantageous to employ as a detecting medium paramagnetic material having colorific properties to more distinctly mark the place of discontinuity.

In practice I provide the pan 12 with means (not shown) for draining off the liquid. The magnetic flux is maintained until the liquid has been completely drained off.

In the foregoing, I have referred to gages as objects under examination. While the invention is primarily intended for testing small objects such as gages, balls, dies, etc. and for the detection of normally invisible defects of the character mentioned, I am fully aware that the invention is of broader scope and applicable to other purposes.

I claim:

1. The method of testing an object of paramagnetic material, which consists in subjecting the object to the action of a magnetic field while in proximity to mobile finely divided paramagnetic material.

2. The method of testing an object of paramagnetic material, which consists in subjecting the object to the action of a magnetic field in a fluid medium containing particles of paramagnetic material in suspension.

3. The method of testing an object of paramagnetic material, which consists in subjecting the object to the action of a magnetic field in a liquid medium containing particles of paramagnetic material in suspension.

4. The method of testing an object of paramagnetic material, which consists in magnetizing the object and bringing finely divided particles of paramagnetic material in contiguity to the object.

5. The method of testing an object of paramagnetic material, which consists in holding finely divided paramagnetic material in a state of suspension near a surface of the object and passing magnetic lines of force through said object.

6. An apparatus for testing paramagnetic material, comprising a receptacle containing a medium holding paramagnetic material in suspension and means for passing magnetic lines of force through the said medium.

In testimony whereof, I affix my signature.

WILLIAM E. HOKE.